United States Patent [19]

Motoki et al.

[11] Patent Number: 4,991,029
[45] Date of Patent: Feb. 5, 1991

[54] STILL PICTURE PROCESSING METHOD AND/OR APPARATUS

[75] Inventors: Kazuo Motoki; Kazunori Yasuda; Shyunsuke Takano; Satoru Maeda; Susumu Orikasa; Munehiro Yoshikawa, all of Kanagawa; Yasushi Noguchi, Saitama; Mari Sugiura, Kanagawa; Akihiko Tao, Kanagawa; Kosuke Yoshimura, Kanagawa, all of Japan

[73] Assignee: Sony Corporation, Tokyo, Japan

[21] Appl. No.: 403,200

[22] Filed: Sep. 5, 1989

[30] Foreign Application Priority Data

| Sep. 7, 1988 | [JP] | Japan | 63-223694 |
| Sep. 12, 1988 | [JP] | Japan | 63-228175 |
| Sep. 28, 1988 | [JP] | Japan | 63-243343 |
| Sep. 28, 1988 | [JP] | Japan | 63-243344 |

[51] Int. Cl.$^5$ ............................................. H04N 1/393
[52] U.S. Cl. .................................... 358/451; 358/448; 340/731
[58] Field of Search .................. 358/448, 451, 452, 77; 382/47; 340/731

[56] References Cited

U.S. PATENT DOCUMENTS

| 3,976,982 | 8/1976 | Eiselen | 358/77 |
| 4,084,195 | 4/1978 | Pereira | 358/448 |
| 4,610,026 | 9/1986 | Tabata et al. | 358/451 |
| 4,633,503 | 12/1986 | Hinman | 358/451 |
| 4,654,651 | 3/1987 | Kishi et al. | 340/731 |
| 4,680,720 | 7/1987 | Yoshii et al. | 358/451 |
| 4,686,580 | 8/1987 | Kato et al. | 358/77 |
| 4,775,886 | 10/1988 | Hirosawa | 358/450 |
| 4,809,345 | 2/1989 | Tabata et al. | 358/451 |
| 4,835,618 | 5/1989 | Shimizu | 358/451 |
| 4,862,285 | 8/1989 | Miyakawa | 358/451 |

Primary Examiner—Edward L. Coles, Sr.
Assistant Examiner—Thomas D. Lee
Attorney, Agent, or Firm—Philip M. Shaw, Jr.

[57] ABSTRACT

A method of processing original still picture data representing an original still image and stored in a video memory and storing processed still picture data representing a processed still image in a predetermined location of the video memory comprising the steps of setting an XY orthogonal coordinate system on the video memory, setting a reference line parallel to one of the X and Y axes of the orthogonal coordinate system and passing through a point of intersection of lines, each of which connects corresponding pixels of the original and processed still images, moving multiples the pixel data on a line of the original still image parallel to the reference line and furthest from the reference line to addresses of the video memory forming a line of the processed still image, and repeating the preceding step for pixel data on lines of the still image parallel to the reference line and second furthest from the reference line and succeeding lines, to thereby store the processed still picture data representing the processed still image in the video memory. An apparatus employing this method for processing original still picture data is also provided.

8 Claims, 14 Drawing Sheets

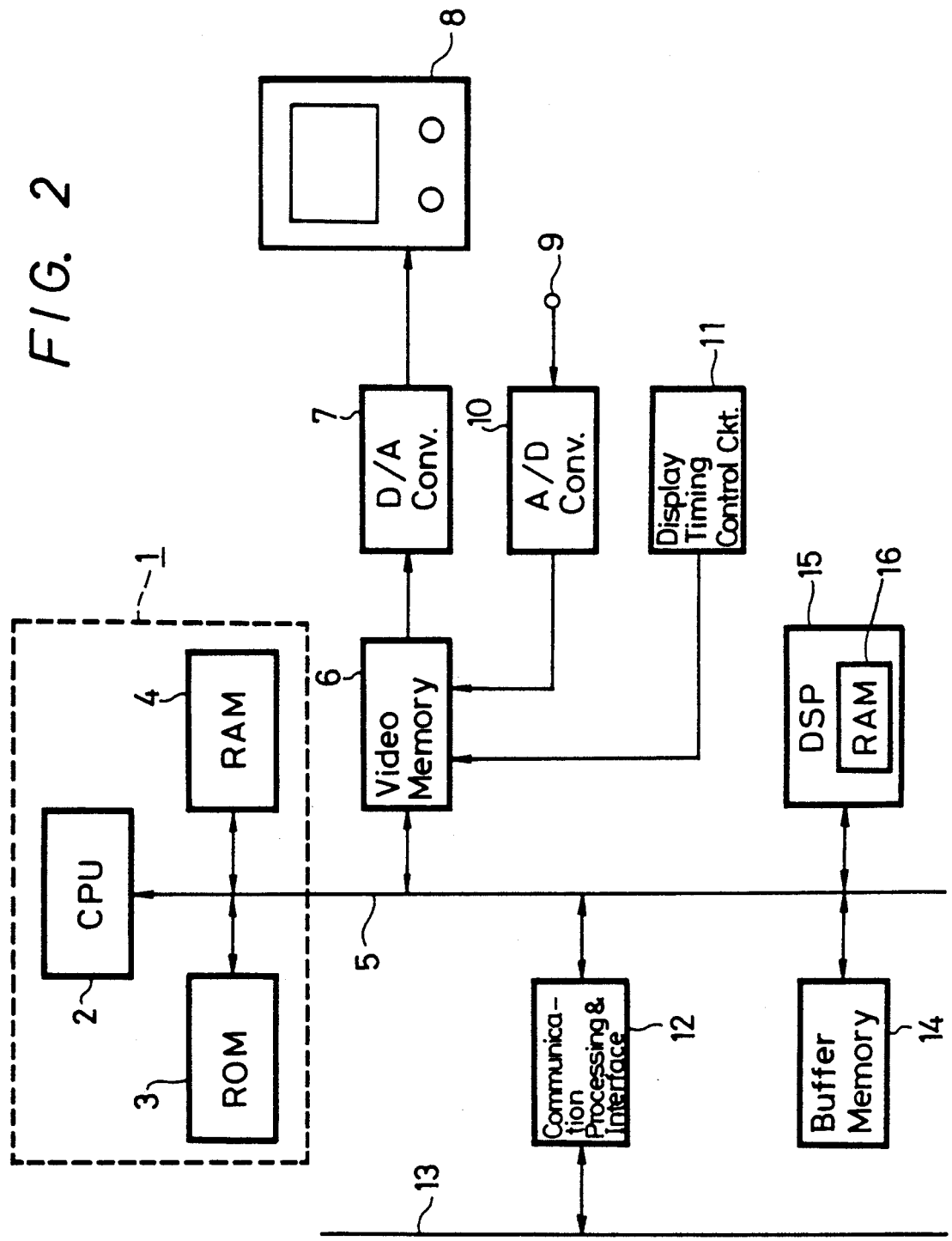

F I G. 16
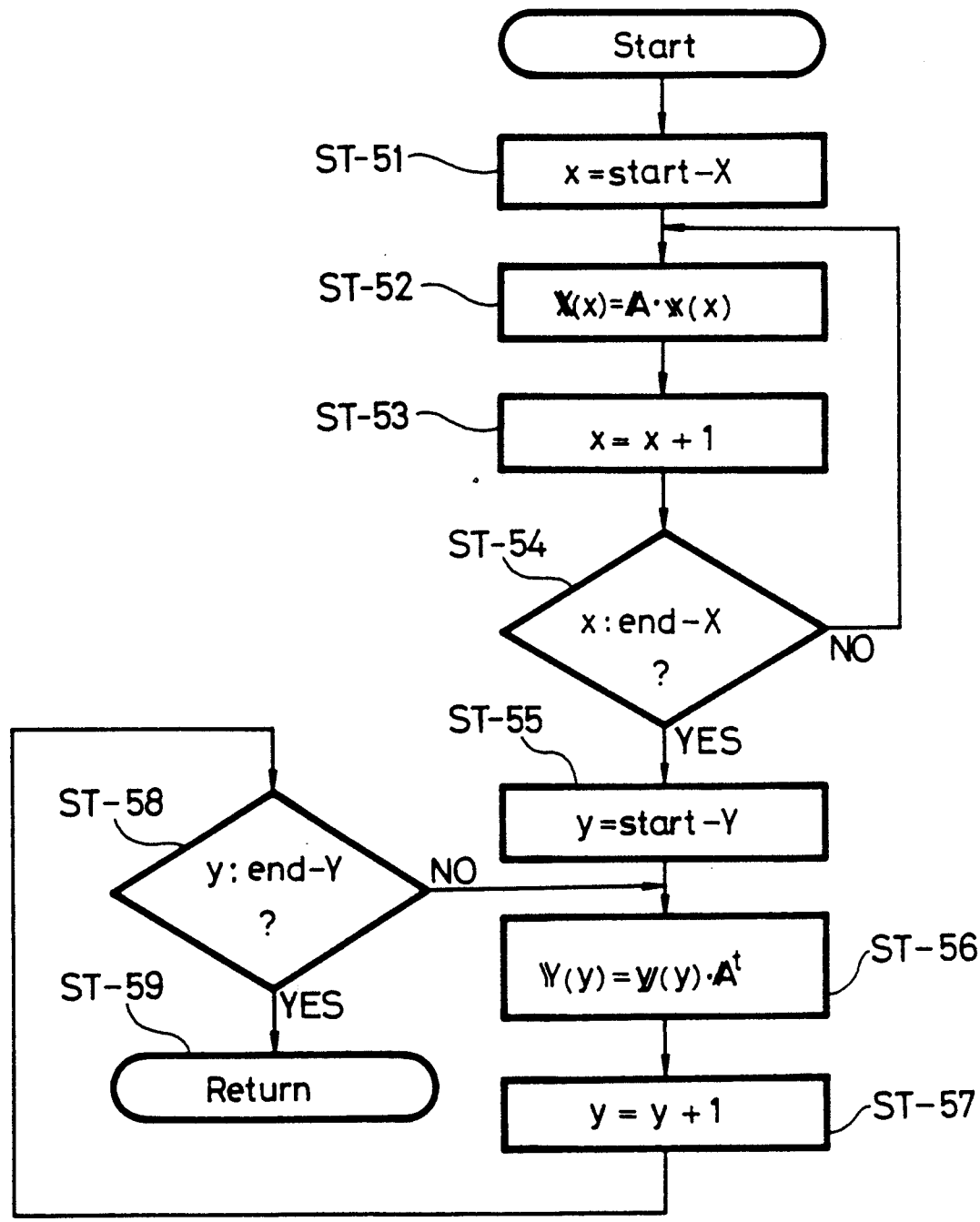

STILL PICTURE PROCESSING METHOD AND/OR APPARATUS

BACKGROUND OF THE INVENTION

1. Field of the Invention

The present invention relates generally to still picture processing systems and, more particularly, is directed to a still picture processing method and/or apparatus in which a processed still picture signal of a processed still picture similar to an original still picture of an original still picture signal stored in a memory is re-stored in the memory at its desired address.

2. Description of the Prior Art

An example of the prior art will be explained hereinafter with reference to FIG. 1A to 1C.

When an enlarged or magnified still picture signal of an original still picture signal stored in a video memory is stored in the video memory at its desired location instead of the original still picture signal in such a manner that a magnified still picture having a rectangular area $A_2 B_2 C_2 D_2$ of an original still picture having, for example, a rectangular area $A_1 B_1 C_1 D_1$ is moved in parallel to a desired location on a memory plane corresponding to a picture screen as shown in FIG. 1A, if the original still picture signal and the magnified still picture signal partly or wholly overlap with each other, the original still picture signal of the original still picture having the rectangular area $A_1 B_1 C_1 D_1$ is temporarily transferred to a buffer memory as shown in FIG. 1B, and then this still picture signal is magnified as shown in FIG. 1C and stored in the original video memory instead of the original still picture signal.

The example of the above-mentioned prior art, however, needs a buffer memory whose storage capacity is the same as that of the video memory, which provides an expensive apparatus for processing a still picture. Also, the original still picture signal, stored in the video memory, is transferred to the buffer memory and is again transferred to the video memory so that a processing time for obtaining a processed still picture signal from the original still picture signal is increased considerably.

OBJECTS AND SUMMARY OF THE INVENTION

Accordingly, it is an object of the present invention to provide an improved still picture data processing method and/or apparatus which can eliminate the above-mentioned defects encountered with the prior art.

It is another object of the present invention to provide a still picture data processing method and/or apparatus of a simplified arrangement which employs a memory of a small storage capacity.

It is still another object of the present invention to provide a still picture data processing method and/or apparatus of a simplified arrangement which employs a memory of high processing speed.

According to an aspect of the present invention, there is provided a method of processing original still picture data representing an original still image and stored in a video memory and storing processed still picture data representing a processed still image in a predetermined location of said video memory, said method comprising the steps of:

(a) setting an XY orthogonal coordinate system on said video memory;

(b) setting a reference line parallel to one of X and Y axes of said orthogonal coordinate system and passing through a point of intersection of lines, each of which connects corresponding pixels of said original and processed still images;

(c) moving the pixel data on a line of said original still image parallel to said reference line and furthest from said reference line to addresses of said video memory forming a line of said processed still image; and (d) repeating the preceding step for pixel data on lines of said still image parallel to said reference line and second furthest from said reference line and succeeding lines, to thereby store the processed still picture data representing said processed still image in said video memory.

According to another aspect of the present invention, there is provided an apparatus for processing an original still picture data representing an original still image and generating a processed still picture data representing a processed still image comprising:

(1) video memory means for storing said original still picture data and said processed still picture data;

(2) means for setting an XY orthogonal coordinate system on said video memory means;

(3) means for setting a reference line parallel to one of X and Y axes of said orthogonal coordinate system and passing through a point of intersection of lines, each of which connects corresponding pixels of said original and processed still images; and (4) processing and restoring means beginning from the pixel data on a line of said original still image parallel to said reference line and furthest from said reference line for processing the pixel data on a line of said original still image line by line and for restoring the processed pixel data to addresses of said video memory means forming a line of said processed still image.

These and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIG. 2 is a block diagram of an embodiment of the present invention;

FIGS. 16 and 17 are flow charts to which reference will be made in explaining the operation for the spline interpolation, respectively.

DETAILED DESCRIPTION OF PREFERRED EMBODIMENTS

Figure 1A:
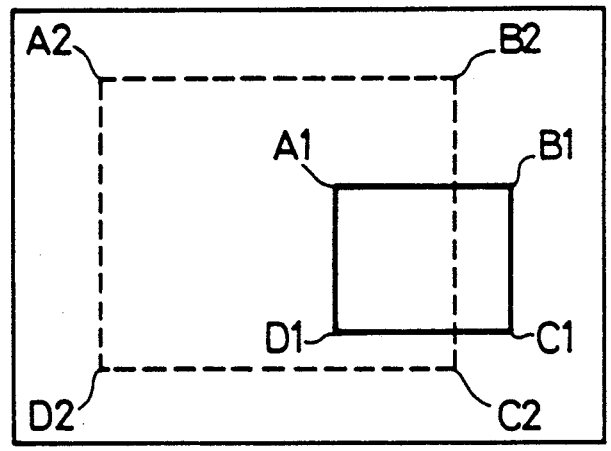
FIGS. 1A to 1C are schematic diagrams useful for explaining an operation of the prior art.
Figure 1B:
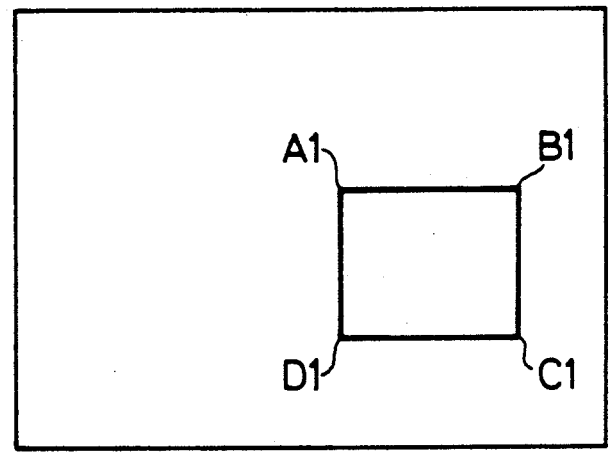
Figure 1C:
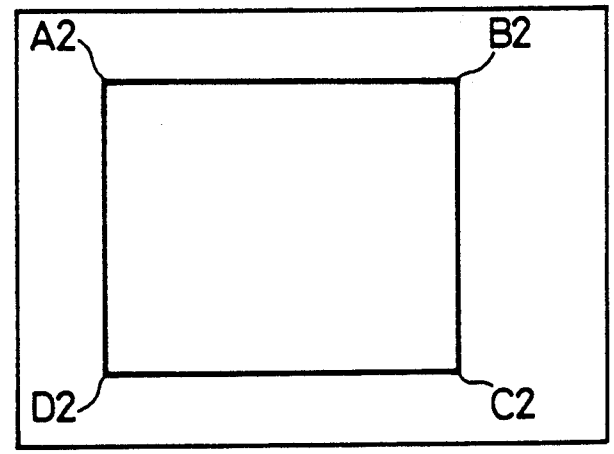

The present invention will now be described with reference to the drawings.

Referring to the drawings in detail and initially to FIG. 2, an embodiment of the present invention which is applied to still picture terminal apparatus will be described. In FIG. 2, it will be seen that a computer (microcomputer) 1 is comprised of a central processing unit (CPU) 2, a read-only memory (ROM) 3 and a random access memory (RAM) 4. The ROM 3 and the RAM 4 are connected to a bus line 5 of the CPU 2. The bus line 5 might be formed of a data bus, an address bus, a control bus or the like. The computer 1 controls respective portions of a still picture communication terminal apparatus.

A transmission line 13 might be either wireless communication type or wire-communication type. If the transmission line 13 is a wire transmission line, then there are available an integrated services digital network (ISDN), a high speed digital network line, analog telephone network line, digital data exchange network (DDX), special network line or the line. The DDX might be either DDXC or DDXP.

A communication processing circuit and interface 12 is connected between the transmission line 13 and the bus line 5, and whose protocol and transmission rate correspond to those of a still picture signal which is transmitted through the transmission line 13. The communication processing circuit carries out encoding, modulation and so on for transmitting data and also carries out decoding, demodulation and so on for receiving data.

A frame memory 6 might be a video RAM, and whose digital video signal input and output terminal and control signal input terminal are connected to the bus line 5. The digital video signal input terminal of the frame memory 6 is connected to an output terminal of an analog-to-digital (A/D) converter 10, and the digital video signal output terminal thereof is connected to an input terminal of a digital-to-analog (D/A) converter 7. Another control signal input terminal of the frame memory 6 is connected to an output terminal of a display timing control circuit 11. The write and read of the frame memory 6 are controlled by the computer 1 and the display timing control circuit 11. The frame memory 6 includes horizontal and vertical address counters, a memory controller and the like, though not shown.

An input terminal 9 is supplied with an analog video signal. The video signal (video signal from a video camera, a video tape recorder or the like) from the input terminal 9 is supplied to the A/D converter 10, in which it is converted to a digital video signal. This digital video signal therefrom is supplied to and written in the frame memory 6.

The digital video signal read out from the frame memory 6 is converted to an analog video signal by the D/A converter 7. The analog video signal thus converted is supplied to a monitor receiver 8 having a cathode ray tube (CRT) and is then displayed on the cathode ray tube of the monitor receiver 8.

The analog video signal supplied to the input terminal 9 is converted to the digital video signal by the A/D converter 10, and is then stored in the frame memory 6 as the digital still picture signal (whose still picture is a natural picture) as described above. This still picture signal (original still picture signal) is read out from the frame memory 6 under the control of the microcomputer 1, then processed (magnified, reduced or moved with the same size), and the processed still picture signal is written and stored in the frame memory 6 at its desired location instead of the original still picture signal as will be described later. The digital still picture signal stored in the frame memory 6 is read out, and is then supplied, under the control of the microcomputer 1, to the communication processing circuit and interface 12, in which it is processed for transmission and transmitted through the transmission line 13 to other still picture communication terminal apparatus.

A small storage capacity buffer memory 14 is provided, and whose digital video signal input and output terminal and control signal input terminal are connected to the bus line 5. The write and read of the buffer memory 14 are controlled by the microcomputer 1. This buffer memory 14 includes horizontal and vertical address counters, a memory controller and the like though not shown. Further, there is provided a digital signal processing circuit 15 whose input and output terminal is connected to the bus line 5, and which is controlled by the microcomputer 1. A high-speed access RAM 16 is provided in the digital signal processing circuit 15, and the access speed thereof is selected to be very high as compared with that of the video RAM 6.

Figure 3:
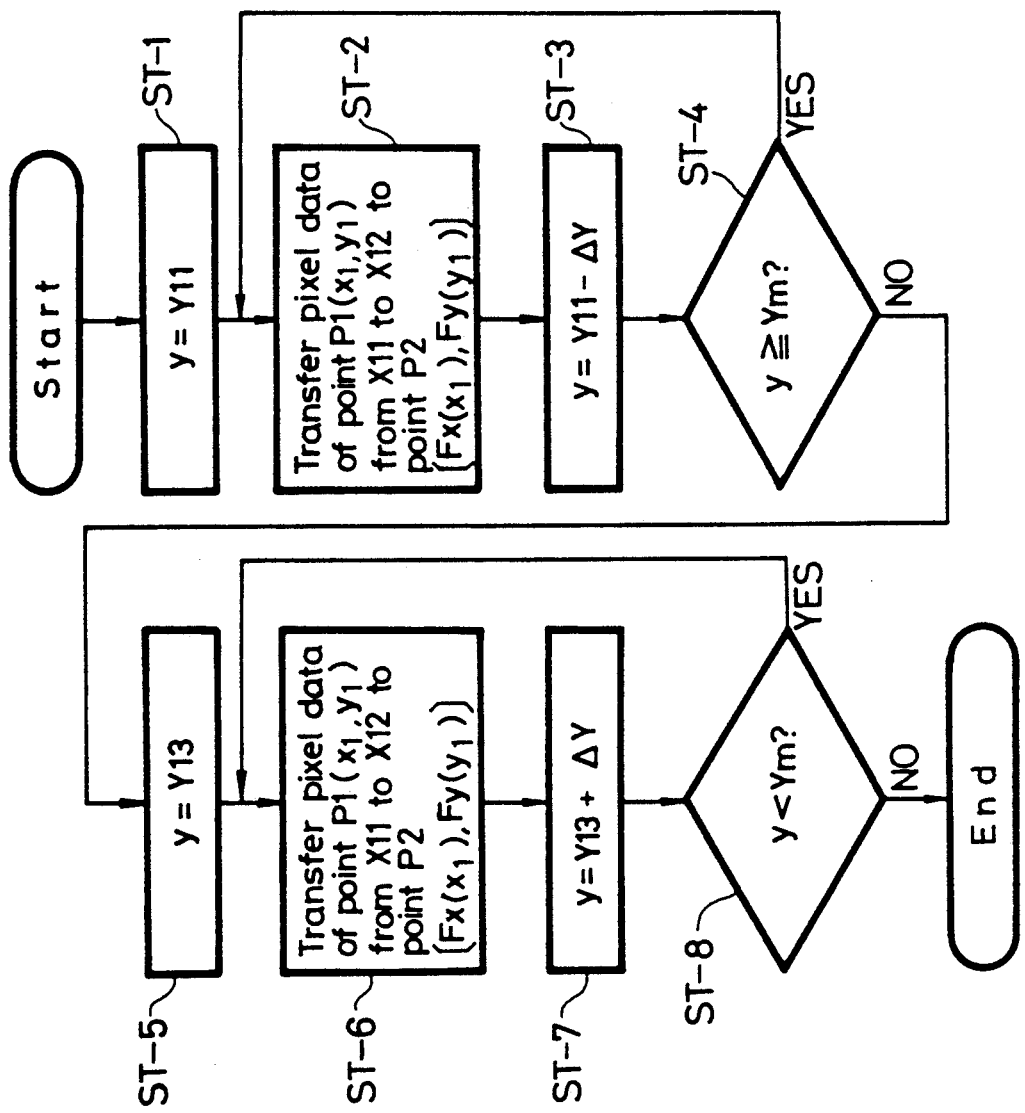
FIG. 3 is a flow chart to which reference will be made in explaining an operation of a first embodiment of the present invention.
Figure 4:
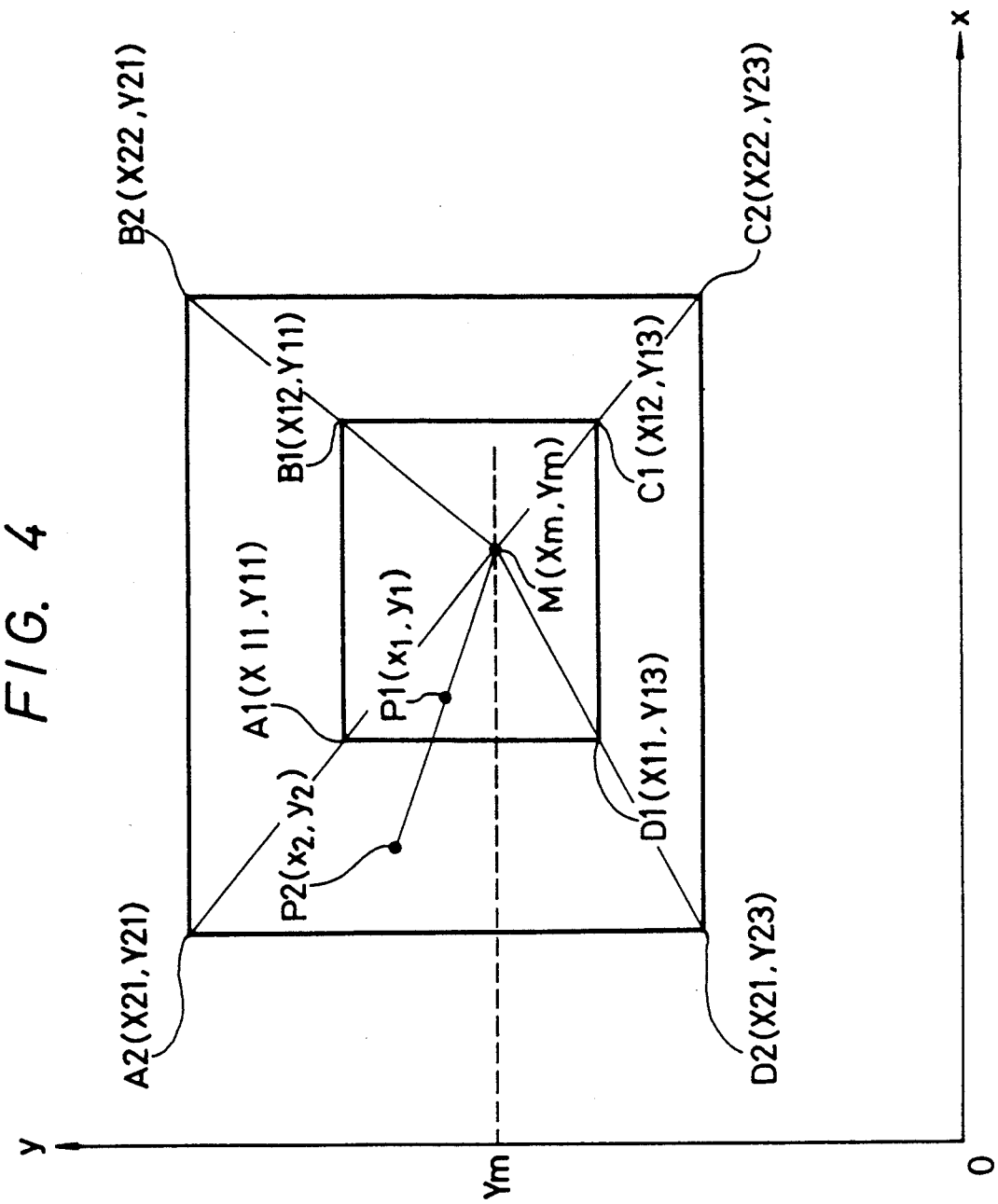
FIG. 4 is a schematic diagram useful for explaining the operation the first embodiment of the present invention.

FIG. 3 is a flow chart to which reference will be made in explaining how to magnify the still picture signal stored in the frame memory 6 under the control of the microcomputer 1 as shown in FIG. 4. Prior to the explanation on the magnifying processing, the original still picture signal (original still picture) and the magnifying-processed still picture signal (magnifying-processed still picture) will be explained with reference to FIG. 4.

As shown in FIG. 4, a memory plane corresponding to the picture screen of the frame memory 6 is set, and an xy orthogonal coordinate system is set on the memory plane. Initially, let us assume that the original still picture of the original still picture signal (whose still picture is a natural picture) stored in the frame memory 6 has a configuration of, for example, a rectangular area $A_1 B_1 C_1 D_1$ and that each side of the rectangular area $A_1 B_1 C_1 D_1$ is parallel to the x axis or y axis. Also, (X11, Y11), (X12, Y11), (X12, Y13) and (X11, Y13) assume coordinates of the respective points $A_1$, $B_1$, $C_1$ and $D_1$ thereof. In this case, let it be assumed that pixel data of respective pixels forming the original still picture having the rectangular configuration are stored, i.e. are repeated at $\alpha$ addresses in the x direction and at $\beta$ addresses in the y direction, i.e. they are stored in $\alpha \cdot \beta$ addresses in total so that the magnification factor is $\alpha \cdot \beta$.

Further, let us assume that the magnified still picture of the magnifying-processed still picture signal of the original still picture signal is such that the original still picture is moved parallel to a desired location on the memory plane corresponding to the picture screen. Also, let it be assumed that the magnified still picture has a rectangular area $A_2 B_2 C_2 D_2$, each side of the rectangular area $A_2 B_2 C_2 D_2$ is parallel to the x axis or the y axis and that (X21, Y21), (X22, Y21), (x22, Y23) and (X21, Y23) represent coordinates of the respective points $A_2$, $B_2$, $C_2$ and $D_2$, respectively. In FIG. 4, M (Xm, Ym) represents a point of intersection of lines, each of which connects corresponding points of the rectangular areas $A_1 B_1 C_1 D_1$ and $A_2 B_2 C_2 D_2$. A line y=Ym passing through the point M (Xm, Ym), is parallel to the x axis, which is a reference line in this case.

In the case of FIG. 4, the whole area of the original still picture overlaps the magnified still picture, and even if the reference line is parallel to either the x axis or y axis, the original still picture and the magnified still picture are divided in two by the reference line.

Let us now explain a relationship between a desired point P1 $(x_1, y_1)$ located within the original still picture and a point P2 $(x_2, y_2)$ located within the magnified still picture. A line connecting these points P1 and P2 passes the point M of intersection. Values $x_2$ and $y_2$ are functions of values $x_1$ and $y_1$ so that they are expressed as follows:

$$x_2 = Fx (x_1) \quad (1)$$

$$y_2 = Fy (y_1) \quad (2)$$

Since all lines connecting the points $A_2$, $A_1$; $B_2$, $B_1$; $C_2$, $C_1$; and $D_2$, $D_1$ pass through the intersection point M, the function equations (1) and (2) can be solved and the x and y coordinates Xm and Ym can be obtained.

An embodiment of the present invention will be described on the basis of the example shown in FIG. 4 with reference to the flow chart forming FIG. 3.

As shown in FIG. 3, following the Start of the operation, an equality of y=Y11 is set by substituting means at step ST-1. y=Y11 represents a line which includes an upper side of the rectangular area $A_1 B_1 C_1 D_1$ of the original still picture. The routine proceeds from step ST-1 to step ST-2.

In step ST-2, under the control of read and write control means, $\alpha$ pixel data of point P1 $(x_1, y_1)$ (corresponding addresses of the memory 6) from coordinates X11 to X12 on the line y=Y11 are moved to point P2 $(F_x(X_1), F_y(y_1))$ (corresponding addresses of the memory 6). The point P2, in this case, is located on the upper side of the rectangular area $A_2 B_2 C_2 D_2$. Then, the routine proceeds from step ST-2 to step ST-3.

In step ST-3, an equality of y=Y11−ΔY is set by the substituting means, and the routine proceeds from step ST-3 to the next decision step ST-4.

In step ST-4, it is determined by judging means whether y≧Ym is established or not. If it is determined that y≧Ym is established as represented by a YES at step ST-4, the routine returns to step ST-2. If on the other hand it is determined that y≧Ym is not established as represented by a NO at step ST-4, or if y<Ym is established, the routine proceeds to step ST-5.

Steps ST-1 to ST-4 mean that in the range of y≧Ym within the original still picture having the configuration of the rectangular area $A_1 B_1 C_1 D_1$ $\alpha$ pixel data of each point P1 $(x_1, y_1)$ on each line are moved to the corresponding point P2 [Fx $(x_1)$, Fy $(y_1)$] (corresponding addresses of the memory 6) on the line parallel to the reference line y=Ym of the magnified still picture by decrementing y from Y=Y11 by ΔY (corresponding to one address of the memory 6).

In step ST-5, y=Y13 is set by the substituting means, and the equality of y=Y13 represents a line which includes the lower side of the rectangular area $A_1 B_1 C_1 D_1$ of the original still picture. The routine proceeds from step ST-5 to ST-6.

In step ST-6, under the control of the read and write control means, $\alpha$ pixel data at the point P1 $(x_1, y_1)$ (corresponding addresses of the memory 6) extending from X11 to X12 on the line y=Y13 are moved to the corresponding points P2 [Fx $(x_1)$, Fy $(y_1)$] (corresponding addresses of the memory 6) of the magnified processed still picture. In this case, the point P2 is located on the lower side of the rectangular area $A_2 B_2 C_2 D_2$. The routine proceeds from step ST-6 to step ST-7.

In step ST-7, an equality of y=Y13+ΔY is set by the substituting means, and the routine proceeds from step ST-7 to the next decision step ST-8.

In step ST-8, it is determined by the judging means whether an inequality of y<Ym is satisfied or not. If it is determined that y<Ym is satisfied as represented by a YES at step ST-8, the routine returns to step ST-6. If on the other hand it is determined that y<Ym is not satisfied as represented by a NO at step ST-8, i.e. y≧Ym is satisfied, the routine is ended.

In FIG. 3, the steps ST-5 to ST-8 mean that in the range of y<Ym within the original still picture having the the rectangular area $A_1 B_1 C_1 D_1$, by incrementing y from Y=Y13 by ΔY [corresponding to one address of the memory 6], $\alpha$ pixel data of each point P1 $(x_1, y_1)$ on each line are moved to the corresponding point P2 [Fx $(x_1)$, Fy $(y_1)$] [corresponding addresses of the memory 6] on the line parallel to the reference line y=Ym of the magnified still picture.

In the flow chart of FIG. 3, the system of step ST-1 to step ST-4 and the system of step ST-5 to step ST-8 can be replaced with each other or the two systems can be executed at the same time. In short, it is to be noted that the storing location of the pixel data of the original still picture signal stored in the memory is shifted at every line in such a manner that the pixels on the line parallel to the reference line of the original still picture are sequentially moved from the furthest from the reference line to the nearest or from the furthest from the corresponding reference line of the processed still picture to the nearest on a line parallel to the reference line.

While the process for magnifying or enlarging the original still picture is explained in the above-mentioned embodiment, the reducing process for reducing an original still picture is carried out as follows. In this case, the still picture having a rectangular area $A_2 B_2 C_2 D_2$ is used as the original still picture, while the still picture having a rectangular area $A_1 B_1 C_1 D_1$ is employed as a still picture to be reduced in size. Then, the storing location of the pixel data of the original still picture signal stored in the memory is moved at every line in such a manner that the pixels on the line parallel to the reference line of the original still picture are sequentially moved from the furthest from the reference line to the nearest or from the furthest line from the corresponding reference line of the processed still picture to the nearest on the line parallel to the reference line.

In the case of FIG. 4, the whole of the original still picture overlaps on the magnified still picture so that, even when the reference line is parallel either to the x axis or to the y axis, the original still picture and the magnified still picture are divided by two by the reference line. Thus, when the reference line parallel to the y axis is employed instead of the reference line parallel to the x axis, the operation is the same as explained above.

Figure 6:
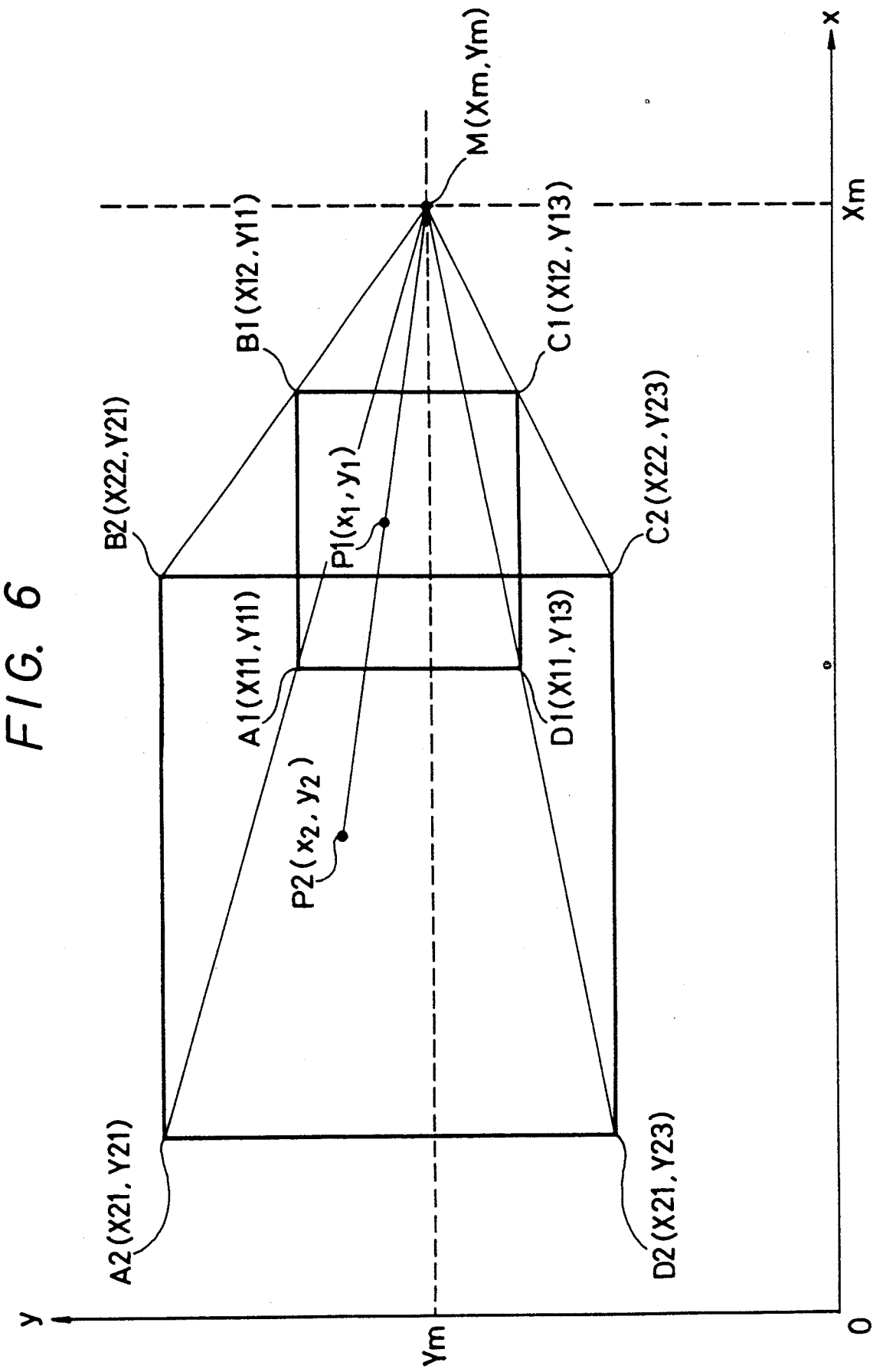
FIG. 6 is a schematic diagram useful for explaining the operation of the second embodiment of the present invention.

If the magnified still picture partly overlaps the original still picture as shown in FIG. 6, pixels on respective points of the original still picture are moved on respective points of the magnified still picture in different manners with respect to the reference line y=Ym parallel to the x axis passing through the intersection point M (Xm, Ym) of lines connecting corresponding points of the original still picture and the magnified still picture and with respect to the reference line x=Xm parallel to the y axis. In other words, if the line y=Ym parallel to the x axis is employed as the reference line, the original still picture and the magnified still picture are divided by two by this reference line so that the same operations as those in FIG. 3 will be carried out.

The operation in which the line x=Xm passing through the point M and parallel to the y axis is employed as the reference line will be explained with reference to a flow chart forming FIG. 5.

Figure 5:
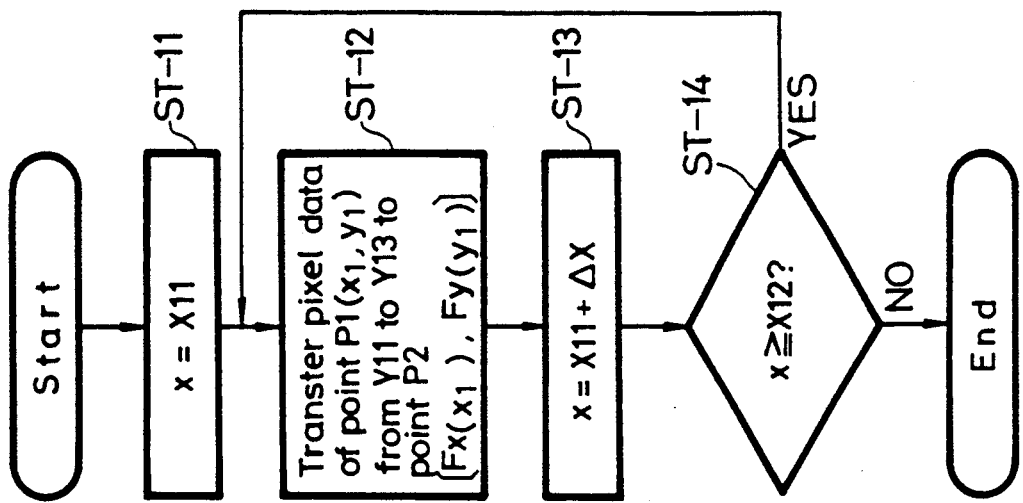
FIG. 5 is a flow chart to which reference will be made in explaining an operation of a second embodiment of the present invention.

As shown in FIG. 5, following the Start of the operation, an equality of x=X11 is set by substituting means at step ST-11. The line x=X11 includes the left side of the rectangular area $A_1 B_1 C_1 D_1$ of the original still picture. The routine proceeds from step ST-11 to step ST-12.

In step ST-12, α pixel data at the point P1 ($x_1$, $y_1$) [corresponding addresses of the memory 6] from Y11 to Y13 on the line x=X11 are moved to the point P2 [Fx ($x_1$), Fy ($y_1$)] [corresponding addresses of the memory 6] by the read and write control means. The routine proceeds from step ST-12 to step ST-13.

In step ST-13, an equality of x=X11+ΔX is set by the substituting means, and then the routine proceeds from step ST-13 to step ST-14. In step ST-14, it is determined by judging means whether an inequality of x≧X12 is satisfied or not. If it is determined that the equality of x≧X12 is satisfied as represented by a YES at step ST-14, the routine returns to step ST-12. If on the other hand the equality of x≧X12 is not satisfied as represented by a NO at step ST-14, the routine is ended.

According to the steps ST-11 to ST-14, in the range of x≧X12 within the original still picture having the rectangular area $A_1 B_1 C_1 D_1$, α pixel data of the respective points P1 ($x_1$, $y_1$) on the lines are moved to the corresponding points P2 [Fx ($x_1$), Fy ($y_1$)] [the corresponding addresses of the memory 6] on the line parallel to the reference line y=Ym of the magnified still picture by increasing x from x=X11 by ΔX [corresponding to one address of the memory 6].

In this example, the original still picture is magnified. When the original still picture is reduced, the still picture having the rectangular area $A_2 B_2 C_2 D_2$ is employed as the original still picture, while the still picture having the rectangular area $A_1 B_1 C_1 D_1$ is employed as a still picture to be reduced. Then, the storing location of the pixel data of the original still picture signal stored in the memory is moved at every line in such a manner that pixel data on the line parallel to the reference line of the original still picture are sequentially moved to the line parallel to the reference line from the furthest position of the reference line to the nearest position, or from the furthest line of the corresponding reference line of the processed still picture to the nearest line. In this case, the processed still picture is the same as the original still picture in size, or it might be a congruent still picture.

In the above-noted explanation, the respective points of the original still picture and the respective corresponding points of the processed still picture are not always the practical address points of the memory. Therefore, in practice, data of imaginary points existing among the respective points of the original still picture must be calculated by the interpolation. Then, the calculated data must be mappped on the address positions of the respective points of the processed still picture. Then, in order to interpolate the data at the imaginary points, in general, address data at a plurality of points in the up and down direction and the left and right direction around the imaginary point are necessary. Thus, when the calculated data are sequentially mapped from the upper direction in the embodiment of FIG. 4, the data of the processed still picture which are converted to a region where the data necessary for the interpolation exist are written as the mapping approaches the reference line, y=Ym. As a result, the interpolation data is erased and there is then presented a possibility that the interpolation will not be made.

The following embodiment of the invention is made in order to solve the above-mentioned problem, and will be explained with reference to FIGS. 7 and 8.

Figure 8:
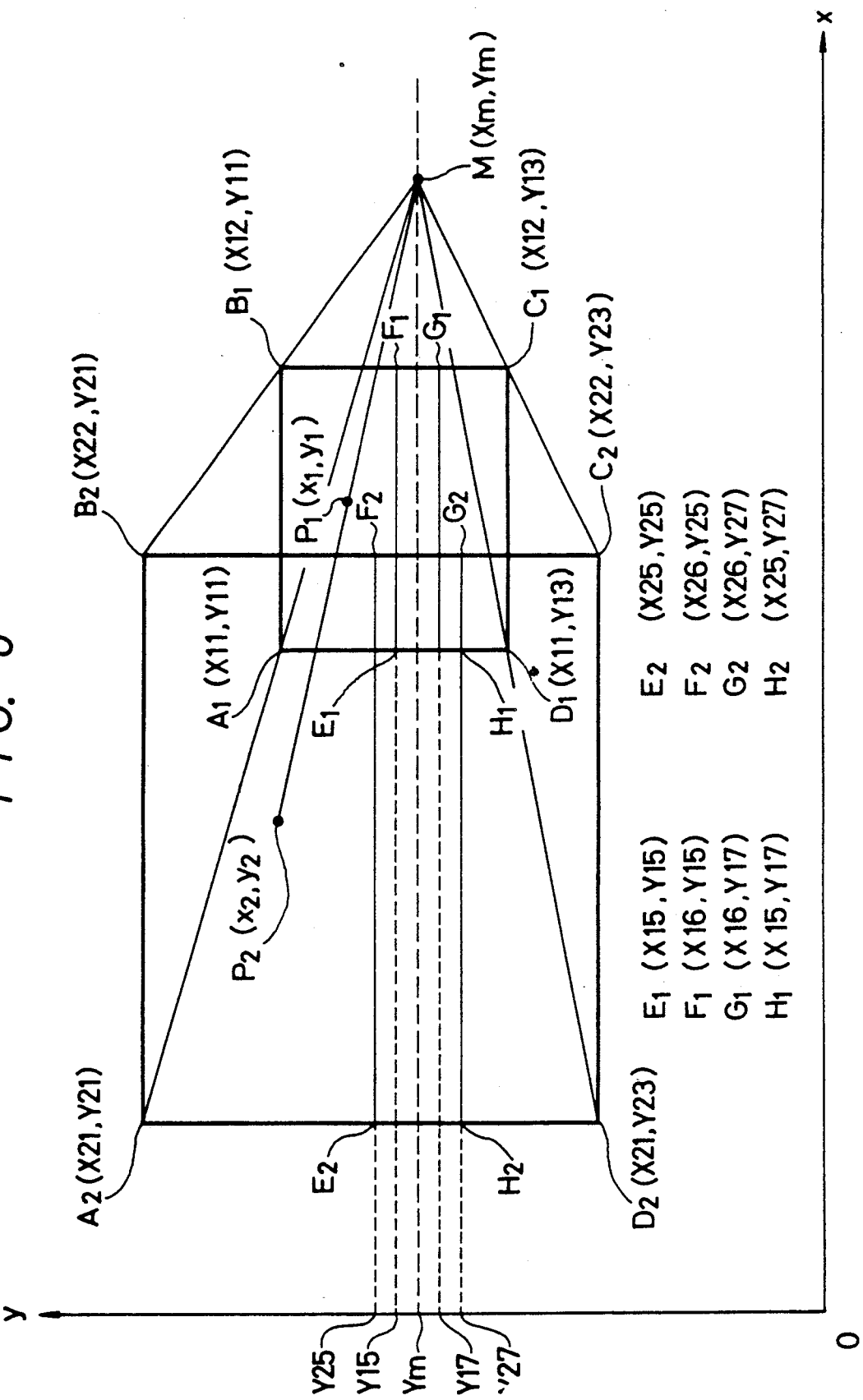
FIG. 8 is a schematic diagram useful for explaining the same.

As shown in FIG. 8, similarly to FIG. 6, the original still picture and the magnified still picture partly overlap with each other, and the reference line y=Ym passes through the overlapping area of the original still picture and the magnified still picture. Also, the reference line y=Ym divides these original still picture and magnified still picture by two.

A band-shaped area having a rectangular area $E_1 F_1 G_1 H_1$, each side of which is parallel to each side of the rectangular area $A_1 B_1 C_1 D_1$ is provided at both sides of the reference line y=Ym of the original still picture. In this event, $w_1/2$ assumes each of the distances of the sides $E_1 F_1$; and $G_1 H_1$ of the band-shaped area from the reference line y=Ym. Further, (X15, Y15), (X16, Y15), (X16, Y17) and (X15, Y17) assume coordinates of the respective points $E_1$, $F_1$, $G_1$ and $H_1$.

Furthermore, a band-shaped area having a rectangular area $E_2 F_2 G_2 H_2$, each side of which corresponds to each side of the rectangular area $A_2 B_2 C_2 D_2$ is provided at both sides of the reference line y=Ym of the processed still picture. $W_2/2$ assumes each of the distances of the sides $E_2 F_2$; and $G_2 H_2$ of the band-shaped area from the reference line, y=Ym. Also, (X25, Y25), (X26, Y25), (X26, Y27) and (X25, Y27) assume the coordinates of the respective points $E_2$, $F_2$, $G_2$ and $H_2$, respectively.

With above-noted arrangements, similarly to FIG. 4, the functions, $x_2$=Fx ($x_1$) and $y_2$=Fy ($y_1$) can be calculated, and the coordinate (Xm, Ym) of the point M can also be calculated.

Figure 7:
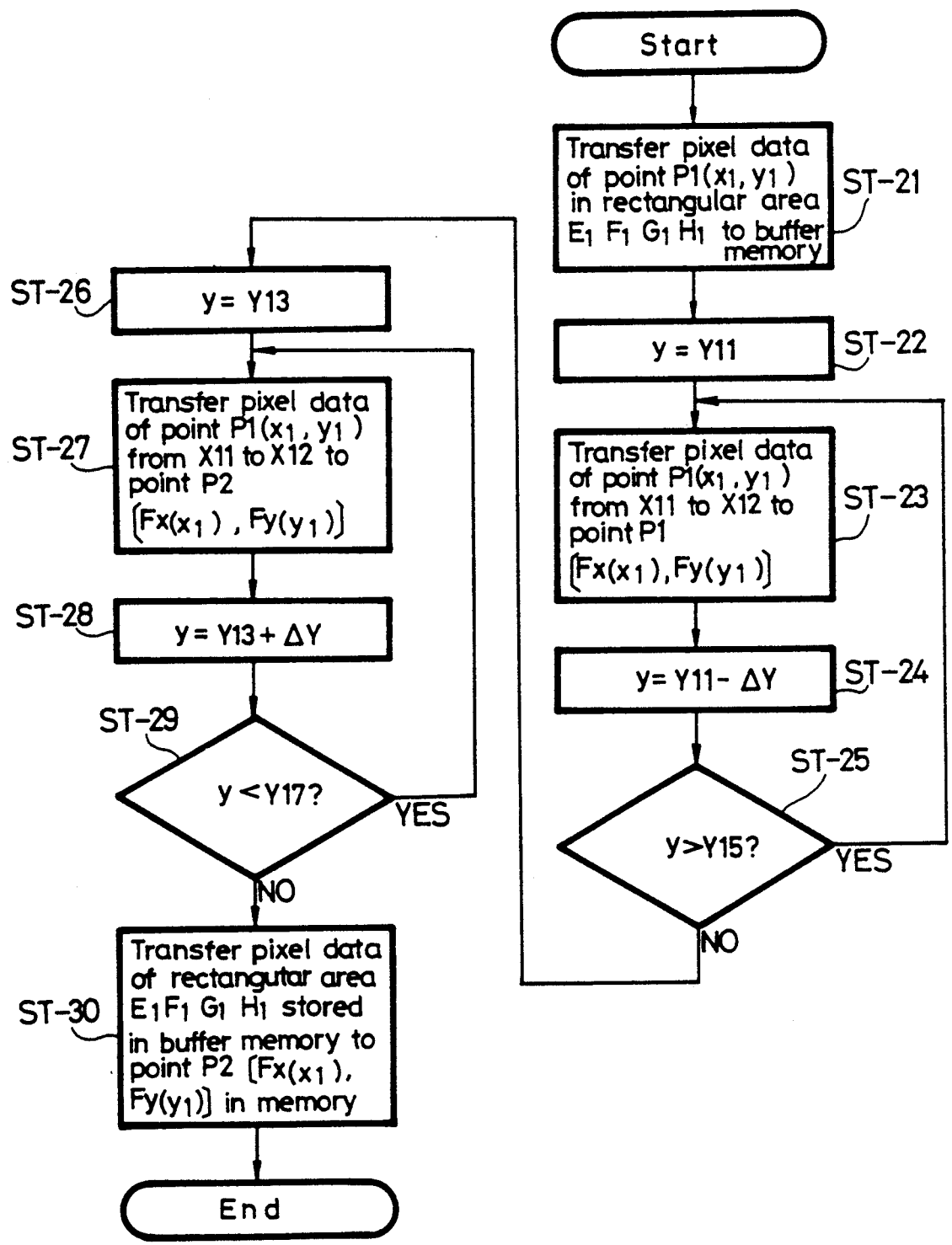
FIG. 7 is a flow chart to which reference will be made in explaining an operation of a third embodiment of the present invention.

In association with the example shown in FIG. 8, let us explain a second embodiment of the present invention with reference to a flow chart forming FIG. 7.

Referring to FIG. 7, following the Start of the operation, the whole pixel data of the point $P_1$ ($x_1$, $y_1$) of the rectangular area $E_1 G_1 F_1 H_1$ of the original still picture having the rectangular area $A_1 B_1 C_1 D_1$ and stored in the main memory 6 are transferred to the buffer memory 14 by the write and read control means (in step ST-21). The routine proceeds from step ST-21 to step ST-22.

In step ST-22, an equality of $y = Y11$ is set by the substituting means. $y = Y11$ means a line which includes the upper side of the rectangular area $A_1 B_1 C_1 D_1$ of the original still picture. Then, the routine proceeds from step ST-22 to step ST-23.

In step ST-23, a pixel data of the point $P_1 (x_1, y_1)$ [corresponding addresses of the main memory 6] from X11 to X12 on the line $y = Y11$ are moved to point $P_2$ [Fx $(x_1)$, Fy $(y_1)$] [corresponding addresses of the main memory 6] by the write and read control means. In that event, the point $P_2$ is located on the upper side of the rectangular area $A_2 B_2 C_2 D_2$. The routine proceeds from step ST-23 to step ST-24.

In step ST-24, an equality of $y = Y11 - \Delta Y$ is set by the substituting means. The routine proceeds from step ST-24 to the next decision step ST-25.

In decision step ST-25, it is determined by judging means whether or not an inequality of $y > Y15$ is satisfied. If it is determined that $y > Y15$ is satisfied as represented by a YES at step ST-25, then the routine returns to step ST-23. If on the other hand it is determined that $y > Y15$ is not satisfied, i.e. $y < Y15$ is satisfied as represented by a NO at step ST-25, the routine proceeds to step ST-26.

According to step ST-22 to step ST-25, a pixel data of the point $P_1 (x_1, y_1)$ on the respective lines are moved to the corresponding point $P_2$ [Fx $(x_1)$, Fy $(y_1)$] [corresponding addresses of the main memory 6] on the line parallel to the reference line $y = Ym$ of the magnified still picture by decrementing y from $y = Y11$ by $\Delta Y$ [corresponding to one address of the main memory 6] in a range of $y > Y15$ within the original still picture having the rectangular area $A_1 B_1 C_1 D_1$.

In step ST-26, an equality of $y = Y13$ is set by the substituting means. $y = Y13$ means a line which includes the lower side of the rectangular area $A_1 B_1 C_1 D_1$ of the original still picture. Then, the routine proceeds from step ST-26 to step ST-27.

In step ST-27, a pixel data of the point $P_1 (x_1, y_1)$ [corresponding address of the main memory 6] from X11 to X12 on the line $y = Y13$ are moved to the corresponding point $P_2$ [Fx $(x_1)$, Fy $(y_1)$] [corresponding address of the main memory 6] of the magnified still picture by the write and read control means. In this case, the point $P_2$ is located on the lower side of the rectangular area $A_2 B_2 C_2 D_2$. The routine proceeds from step ST-27 to step ST-28.

In step ST-28, an equality of $y = Y13 + \Delta Y$ is set by the substituting means. Then, the routine proceeds from step ST-28 to the next decision step ST-29.

It is determined at decision step ST-29 by judging means whether or not the inequality of $y < Y17$ is satisfied. If it is determined that the inequality of $y < Y17$ is satisfied as represented by a YES at step ST-29, the routine returns to step ST-27. If it is determined that $y < Y17$ is not satisfied, or if $y \geq Y17$ is satisfied as represented by a NO at step ST-29, the routine proceeds to step ST-30.

According to step ST-26 to step ST-29, a pixel data of the point $P_1 (x_1, y_1)$ on each line are moved to the point $P_2$ [Fx $(x_1)$, Fy $(y_1)$] [corresponding address of the memory 6] on the line parallel to the reference line $y = Y$ of the magnified still picture by increasing y from $y = Y13$ by $\Delta Y$ each in a range of $y < Y17$ within the original still picture having the rectangular area $A_1 B_1 C_1 D_1$.

In step ST-30, the pixel data of the processed still picture signal of the original still picture signal stored in the buffer memory 14 is moved to the point $P_2$ [Fx $(x_1)$, Fy $(y_1)$] in the band-shaped area of the rectangular area $E_2 F_2 G_2 H_2$ within the processed still picture corresponding to the band-shaped area of the rectangular area $E_1 F_1 G_1 H_1$ of the original still picture signal of the main memory 6 by the write and read control means.

In this case, if of the original still picture having the rectangular area $A_1 B_1 C_1 D_1$ stored in the main memory 6 all pixel signals within the rectangular area $E_1 F_1 G_1 H_1$ are magnified and transferred to the buffer memory 14 by the write and read control means, in step ST-30, the magnification-processed pixel signals are directly transferred to the band-shaped area of the rectangular area $E_2 F_2 G_2 H_2$ of the main memory 6. Alternatively, if in step ST-21 within the original still picture having the rectangular area $A_1 B_1 C_1 D_1$ stored in the main memory 6, all pixel signals within the rectangular area $E_1 F_1 G_1 H_1$ are directly transferred to the buffer memory 14 by the write and read control means, in step ST-30, the original still picture signal is magnification-processed and transferred to the band-shaped area of the rectangular area $E_2 F_2 G_2 H_2$ of the main memory 6.

In FIG. 7, the system of step ST-22 to step ST-25 and the system of step ST-26 to step ST-29 may be replaced with each other and they may be executed simultaneously. In short, the storing location of the pixel data of the original still picture signal stored in the main memory 6 is moved at every line in such a manner that the pixel data on the line parallel to the reference line of the original still picture is sequentially transferred on the line parallel to the reference line from the furthest to the nearest or from the reference line corresponding to the processed still picture from the furtheset position to the nearest position.

If a buffer memory [whose storage capacity is very small as compared with that of the main memory 6] is used in addition to the main memory 6 and the above-noted steps ST-21 and ST-30 are executed, when instead of the original still picture signal stored in the main memory 6 the processed still picture signal is re-stored in the main memory 6, it is possible to avoid such a possibility that the interpolation for interpolating the deteriorated pixel signals near the reference line and stored in the main memory becomes impossible.

According to this embodiment, the original still picture is magnified as described above. When the original still picture is reduced, the still picture having the rectangular area $A_2 B_2 C_2 D_2$ is employed as the original still picture and the still picture having the rectangular area $A_1 B_1 C_1 D_1$ is employed as a still picture to be reduced. Under this condition, the above-noted operations are executed.

The interpolating method, which is applicable to the magnifying and reducing processings according to the above-noted embodiments, will be explained below.

When in FIGS. 4, 6 and 8 the length of each side of the rectangular area $A_2 B_2 C_2 D_2$ of the processed still picture is selected to be an integral multiple, for example, twice that of each corresponding side of the rectangular area $A_1 B_1 C_1 D_1$ of the original still picture, pixel data of the rectangular area $A_2 B_2 C_2 D_2$ may be provided only by interpolating the intermediate values of pixel data of the rectangular area $A_1 B_1 C_1 D_1$.

Conversely, when the length of each side of the rectangular area $A_2 B_2 C_2 D_2$ is selected to be 1/integral multiple, for example, ½ of that of each corresponding side of the rectangular area $A_1 B_1 C_1 D_1$, the pixel data of the rectangular area $A_2 B_2 C_2 D_2$ may be provided by cyclically removing pixel data of the rectangular area $A_1 B_1 C_1 D_1$. However, a relationship between the original still picture and the processed still picture is not always limited to those mentioned above. It is frequently observed that they are in a relationship of non-integral multiple. In this case, if data at imaginary position located at the intermediate of the address position of pixel data of the original still picture is calculated by the interpolation and the pixel data of the resultant imaginary position is transferred to the real address position of the processed still picture, it becomes possible to carry out the magnifying and reducing processes.

As the above-noted interpolating method, a spline interpolation will be described by way of example. The spline interpolation of one-dimension will be explained with reference to FIGS. 9 and 10. The most specific feature of the spline interpolation lies in the following points: A curve provided by the interpolation passes through all of sampling points; it has no discontinuous points; it is short in calculation time; it is increased in information band by the complete convolution; and it becomes a cubic curve.

Figure 9:
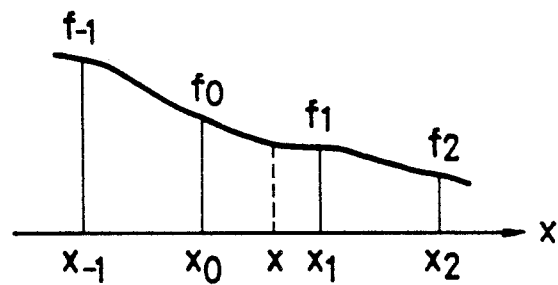
FIGS. 9, 10 and 11 are schematic diagrams useful for explaining an operation of a spline interpolation, respectively.
Figure 10:
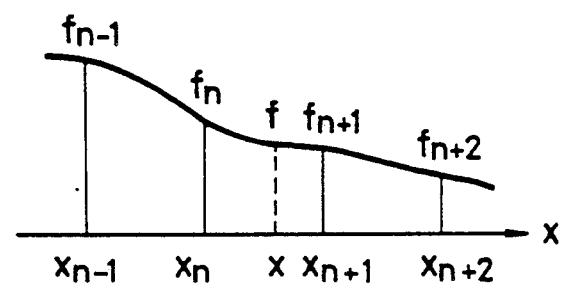

The spline function is expressed by the sum of interval functions expressed by a cubic function which differs at every interval between two sampling points. More specifically, the spline function is a function equal to a cubic function of $f_0(x) = a_0 x^3 + b_0 x^2 + c_0 x + d_0$ which is uniquely determined at four points, $(x_{-1}, f_{-1})$, $(x_0, f_0)$, $(x_1, f_1)$ and $(x_2, y_2)$ in the interval of $[x | x_0 \leq x < x_1]$ as shown in FIG. 9. When the above-noted cubic function is generalized, it is expressed by the following equation (refer to FIG. 10).

$$f(x) = a_n x^3 + b_n x^2 + c_n x^2 + d_n \quad (x_n \leq x < x_{n+1})$$

where $(a_n, b_n, c_n, d_n)$ is given by the following equation.

$$f(\hat{x}) = (f_{n-1}, f_n, f_{n+1}, f_{n+2}) \times \begin{pmatrix} 0 & -2 & 3 & -1 \\ 6 & -3 & -6 & 3 \\ 0 & 6 & 3 & -3 \\ 0 & -1 & 0 & 1 \end{pmatrix} \begin{pmatrix} 1 \\ x \\ x^2 \\ x^3 \end{pmatrix}$$

where $\hat{x}$ is the normalized value for x which is $x_n \leq x < x_{n+1}$.

Figure 11:
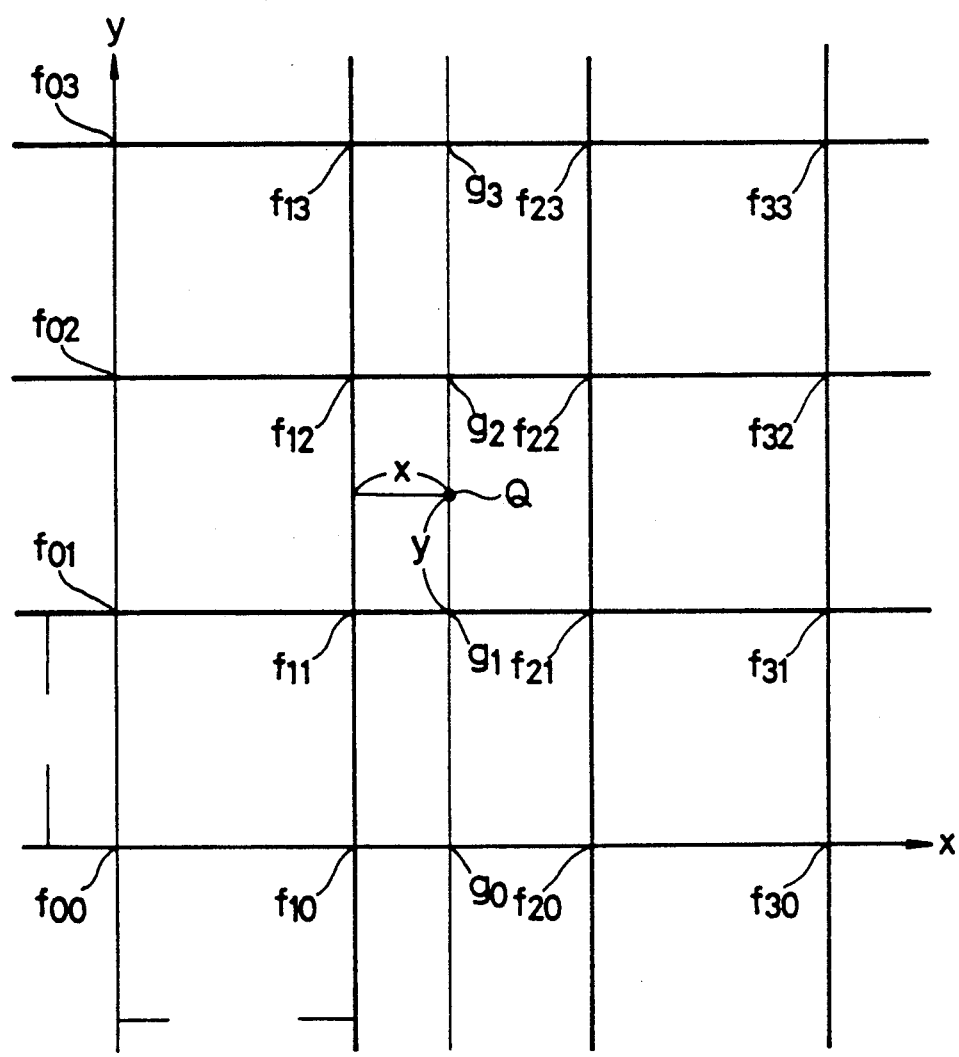

The idea of the above-mentioned spline interpolation is enlarged to the two-dimension, and this will be described with reference to FIG. 11. Let us consider how to obtain pixel data at an imaginary point Q. When the pixel data at the imaginary point Q is obtained, points $g_0, g_1, g_2$ and $g_3$ are obtained first and then the pixel data at the imaginary point Q is obtained on the lines connecting the above-mentioned points $g_0, g_1, g_2$ and $g_3$ as follows.

$$g_m = (f_0 m, f_1 m, f_2 m, f_3 m) \times (A) \begin{pmatrix} 1 \\ x \\ x^2 \\ x^3 \end{pmatrix}$$

Accordingly, pixel data Q at the point Q is expressed as $$Q = (g_0, g_1, g_2, g_3) \ (A) \begin{pmatrix} 1 \\ y \\ y^2 \\ y^3 \end{pmatrix}$$

Thus, the pixel data Q is obtained by the following equation.

$$Q = (1, y, y^2, y^3)(A^t) \times \begin{pmatrix} f_{00} & f_{31} & f_{02} & f_{33} \\ f_{10} & f_{11} & f_{12} & f_{13} \\ f_{20} & f_{21} & f_{22} & f_{23} \\ f_{30} & f_{31} & f_{32} & f_{33} \end{pmatrix} (A) \begin{pmatrix} 1 \\ x \\ x^2 \\ x^3 \end{pmatrix}$$

(A) is expressed by the following equation, and $(A^t)$ is the transposed matrix of (A)

$$(A) = \begin{pmatrix} 0 & -2 & 3 & -1 \\ 6 & -3 & -6 & -3 \\ 0 & 6 & 3 & -3 \\ 0 & -1 & 0 & 1 \end{pmatrix}$$

If $Y = (1, y, y^2, y^3)$, $$A = (A), x = \begin{pmatrix} 1 \\ x \\ x^2 \\ x^3 \end{pmatrix}$$

$$E = \begin{pmatrix} f_{00} & f_{01} & f_{02} & f_{33} \\ f_{10} & f_{11} & f_{12} & f_{13} \\ f_{20} & f_{21} & f_{22} & f_{23} \\ f_{30} & f_{31} & f_{32} & f_{33} \end{pmatrix}$$

then, the pixel data Q is expressed by an inner product of five matrices as follows.

$$Q = Y \cdot A^t \cdot F \cdot A \cdot X$$

The calculation processing for obtaining the pixel data $P_2 (x_2, y_2) = Y(y_1) \cdot A^t \cdot F(x_1, y_1) \cdot A \cdot X(x_1)$ at the point $P_2$ corresponding to pixel data $P_1 (x_1, y_1)$ at the point $P_1$ in FIG. 4 will be explained with reference to a flow chart forming FIG. 12.

Figure 12:
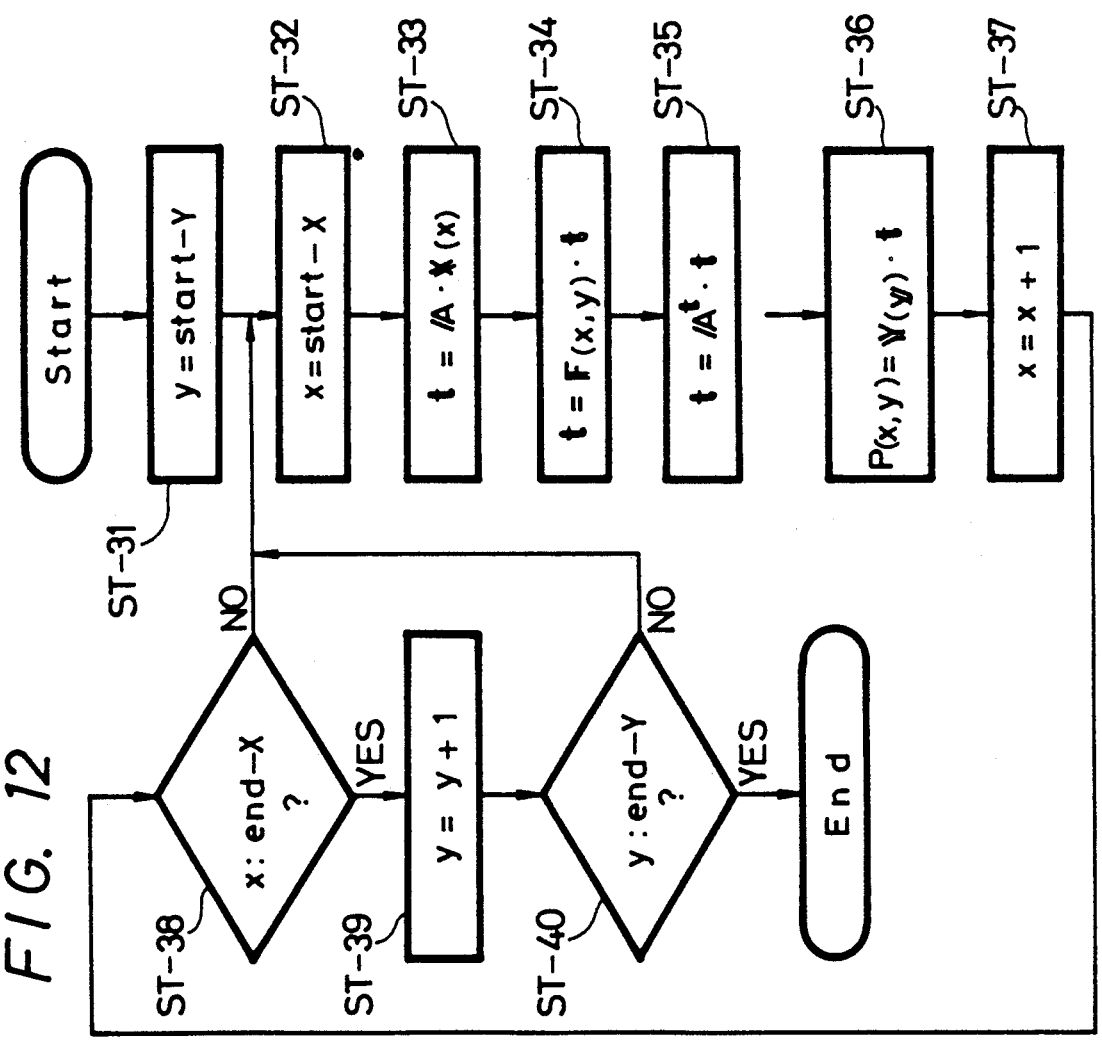
FIG. 12 is a flow chart to which reference will be made in explaining the operation of the spline interpolation.

Referring to FIG. 12, following the Start of operation, y = start − Y (initial value) is set at step ST-31, and then x = start − X (initial value) is set at step ST-32. Then, $t = A \cdot x(x)$ is calculated in step ST-33 where $t$ represents temporary matrix of $(1 \times n)$. $t = F(x, y) \cdot t$ is calculated in step ST-34, and then $t = A^t \cdot t$ is calculated at step ST-35. $P(x, y) = Y(y) \cdot t$ is calculated at step ST-36, and x = x + 1 is set in step ST-37. Then, the routine proceeds to the next decision step ST-38, whereat it is determined whether x is equal to end - X (final value) or not. If a NO is output at step ST-38, the routine returns to step ST-32. If on the other hand a YES is output at step ST-38, the routine proceeds to step ST-39. y = y + 1 is set in step ST-39. Then, the routine proceeds to the next decision step ST-40, whereat it is determined whether y is equal to end -Y (final value) or not. If a NO is output in step ST-40, the routine returns to step ST-32, while if a YES is output at step ST-40, the routine is ended.

The above-noted calculation processing in the example shown in FIG. 12 has a very long processing time.

An example in which interpolation calculations for a plurality of imaginary points are carried out successively will be explained with reference to a flow chart forming FIG. 13. As, for example, shown in FIG. 14, when magnified pixel data $q_0, q_1, q_2, \ldots q_{15}, \ldots$ forming magnified still picture data are obtained from original pixel data $P_0, P_1, P_2, \ldots, P_{14}$ forming original still picture data, the magnified pixel data $q_1$ is obtained by the calculation using, for example, $3 \times 3$ original pixel data $P_0, P_1, P_2, P_5, P_6, P_7, P_{10}, P_{11}$ and $P_{12}$. Further, the magnified data $q_2$ is obtained by the calculation using $3 \times 3$ original pixel data $P_0, P_1, P_2, P_5, P_6, P_7, P_{10}, P_{11}$ and $P_{12}$.

In this way, the original pixel data necessary for the above-noted calculation are repeatedly read out from the video memory.

This will be described with reference to the flow chart of FIG. 13.

Figure 13:
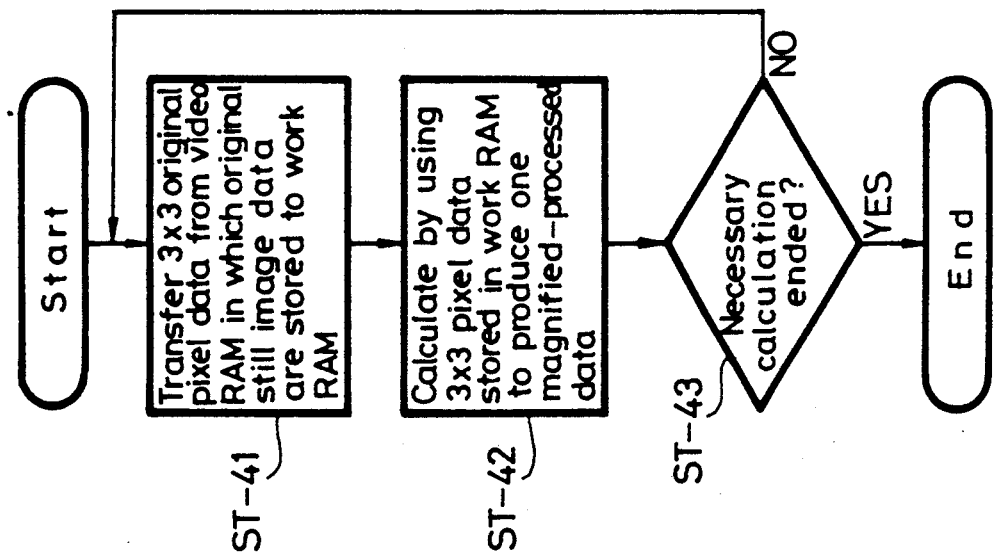
FIG. 13 is a flow chart to which reference will be made in explaining the memory control operation for the spline interpolation.
Figure 15:
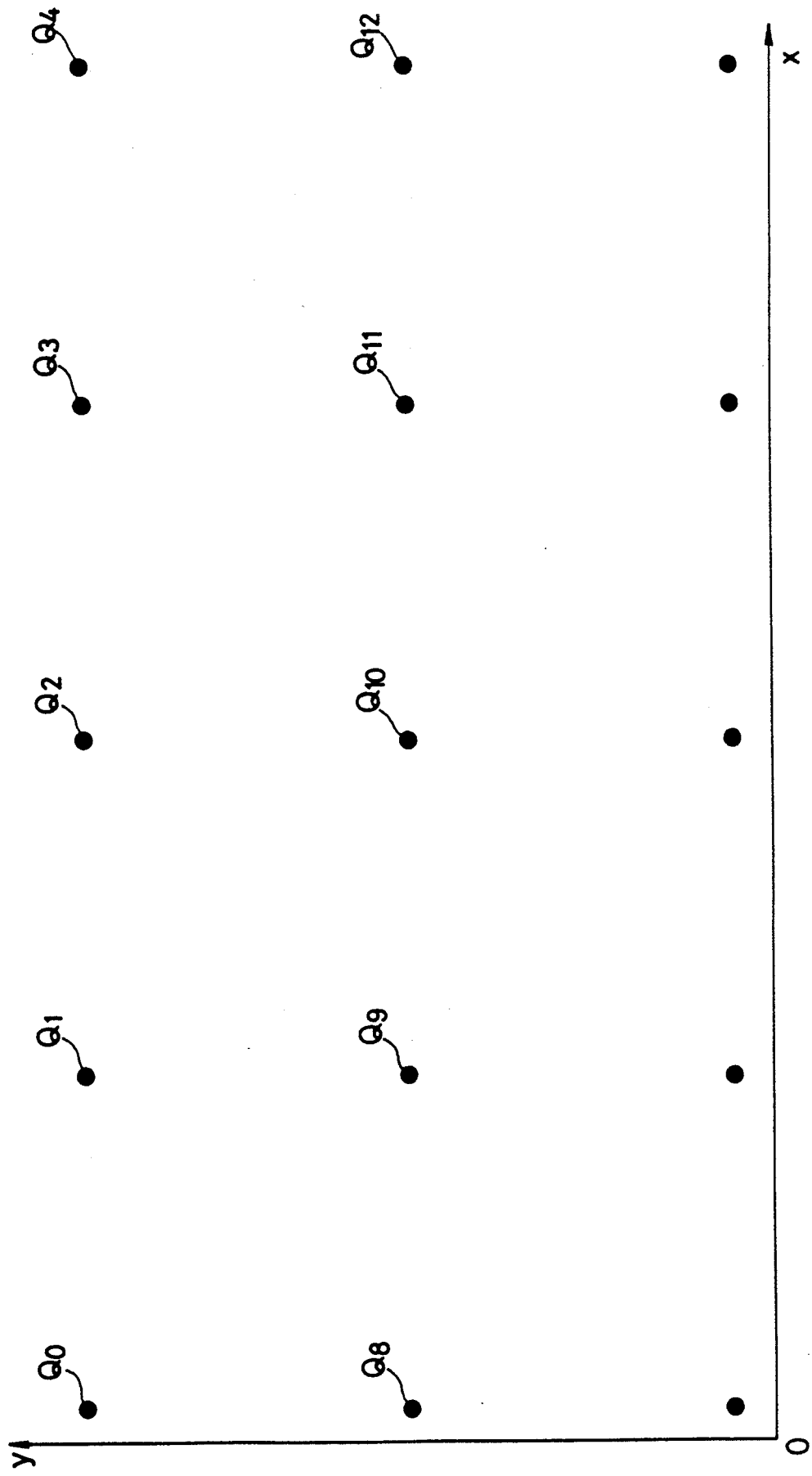

Referring to FIG. 13, following the Start of operation, $3 \times 3$ original pixel data from the video memory (video RAM) 6 in which the original still picture data are stored as shown in FIG. 2 are transferred to the work RAM 16 in the digital signal processing circuit 15 at step ST-41. Then, the calculation is carried out by using $3 \times 3$ pixel data stored in the work RAM 16 to provide one magnified pixel data at step ST-42. Then, the routine proceeds to the next decision step ST-43, whereat it is determined whether or not the predetermined calculation is ended. If a NO is output at step ST-43, the routine returns to step ST-41. If a YES is output at step ST-43, the routine is ended. The magnified pixel data $q_0, q_1, q_2, \ldots$ thus calculated are re-stored in the original video RAM as $Q_0, Q_1, Q_2, \ldots$ instead of the original pixel data as shown in FIG. 15.

As described above, to repeatedly read the original pixel data from the video RAM needs plenty of time, which unavoidably provides an increased processing time.

Next, a method which eliminates the above defect will be described.

Figure 14:
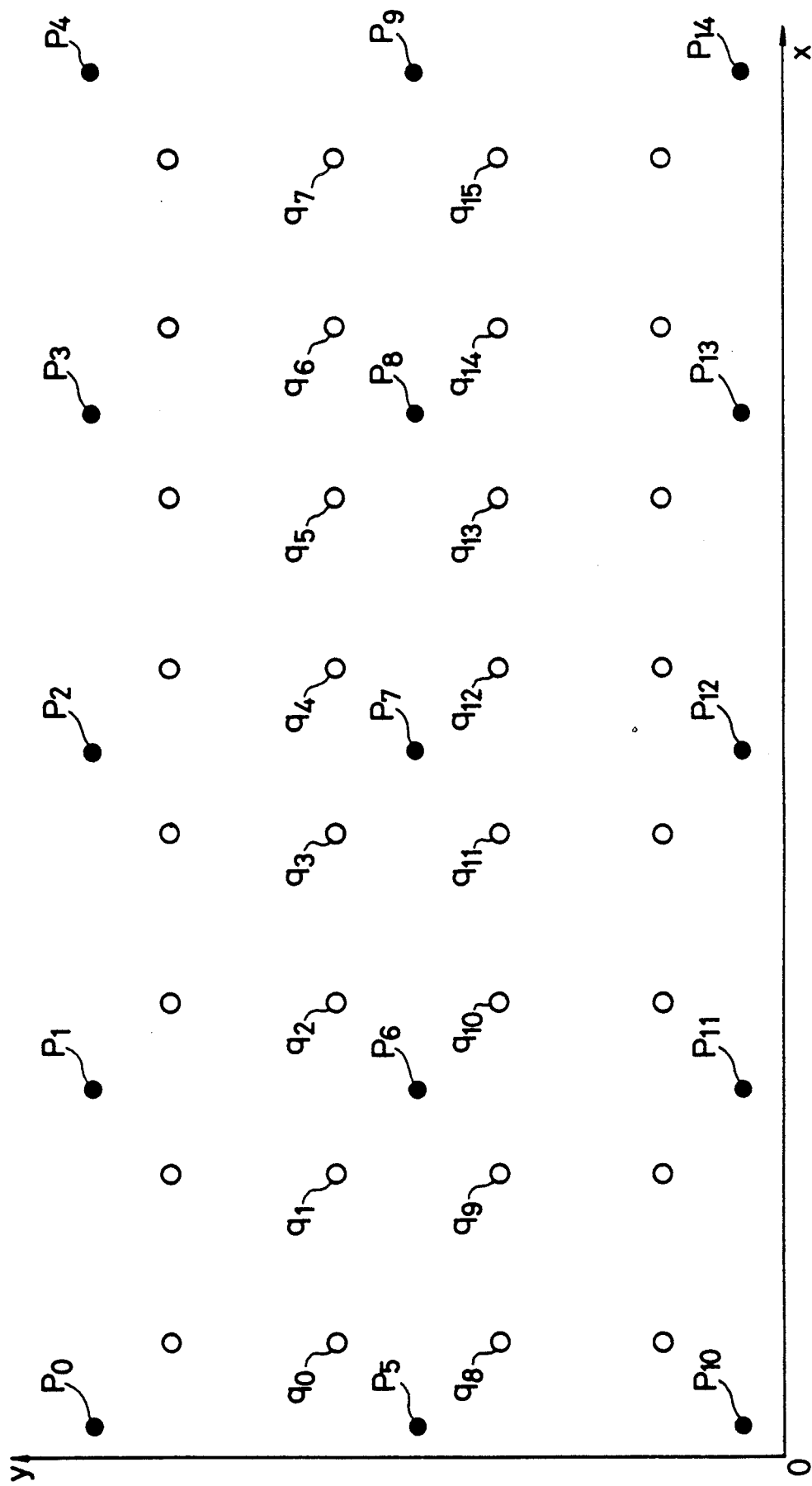
FIGS. 14 and 15 are schematic diagrams to which reference will be made in explaining the operation for the spline interpolation, respectively.

In FIG. 14, since P (x, y) represents all points which exist in a two-dimensional space formed of $0 \leq x < m$ and $0 \leq y < n$, all x forming of $0 \sim m - 1$ and all y forming of $0 \sim n - 1$ are pre-processed so as to form vector arrangements of $X(x) = A \cdot x(x)$ and $Y(y) \; A^r$. Accordingly, with the employment of these vector arrangements $X$ and $Y$, P (x, y) is calculated as $$P(x, y) = Y(y) \cdot F(x, y) \cdot X(x)$$

Thus, the number of product and sum calculations is reduced to $n^3$ and the processing time is about one second. Also, the ratio thereof becomes 1:4000.

The above-noted pre-processing in this example will be explained with reference to a flow chart forming FIG. 16.

Referring to FIG. 16, following the Start of operation, $x = start - X$ (initial value) is set at step ST-51. $X(x) = A \cdot x(x)$ is calculated in step ST-52, and x is set as $x + 1$ in step ST-53. The routine proceeds to the next decision step ST-54, whereat it is determined whether or not x becomes a final value, end - X. If a NO is output at step ST-54, the routine returns to step ST-52. If a YES is output in step ST-54, the routine proceeds to step ST-55.

In step ST-55, $y = start - Y$ (initial value) is set, and $Y(y) = y(y) \cdot A^r$ is calculated in next step ST-56. In next step ST-57, $y = y + 1$ is set, and the routine proceeds to the next decision step ST-58, wherein it is determined whether or not y is equal to end - Y. If a NO is output in step ST-58, the routine returns to step ST-56. If a YES is output at step ST-58, the routine proceeds to the return (step ST-59).

The main processing following the pre-processing will be explained with reference to a flow chart forming FIG. 17.

Figure 17:
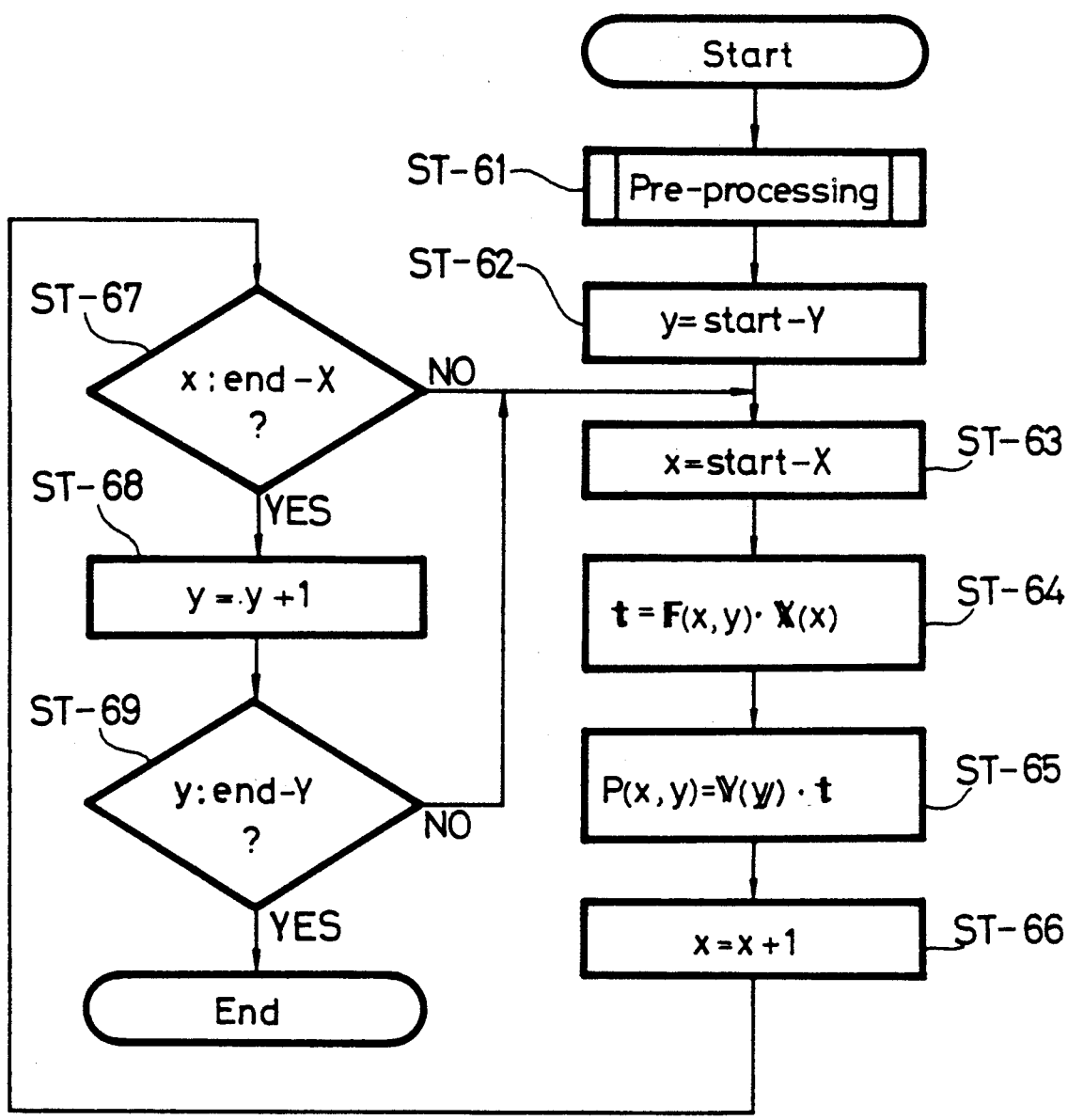

Referring to FIG. 17, following the Start of operation, after the pre-processing shown in FIG. 16 is carried out in step ST-61, $y = start - Y$ (initial value) is set in step ST-62. Then, $x = start - X$ (initial value) is set in step ST-63, and $t = F(x, y) \cdot X(x)$ is calculated at next step ST-64 where $t$ represents the temporary matrix. In the following step ST-65, $P(x, y) = Y(y) \cdot t$ is calculated, and $x = x + 1$ is set in next step ST-66. Then, the routine proceeds to the next decision step ST-67, wherein it is determined whether or not x is equal to end - X (final value). If a NO is output at step ST-67, then the routine returns to step ST-63. If on the other hand a YES is output at step ST-67, then the routine proceeds to step ST-68, wherein $y = y + 1$ is set. It is determined at the next decision step ST-69 whether or not y is equal to end - Y (final value). If a NO is output at step ST-69, then the routine returns to step ST-63. If a YES is output in step ST-69, then the routine is ended.

How to prevent the processing time from being increased when the original pixel data are repeatedly read out from the video RAM 6 will be explained with reference to a flow chart forming FIG. 18.

Figure 18:
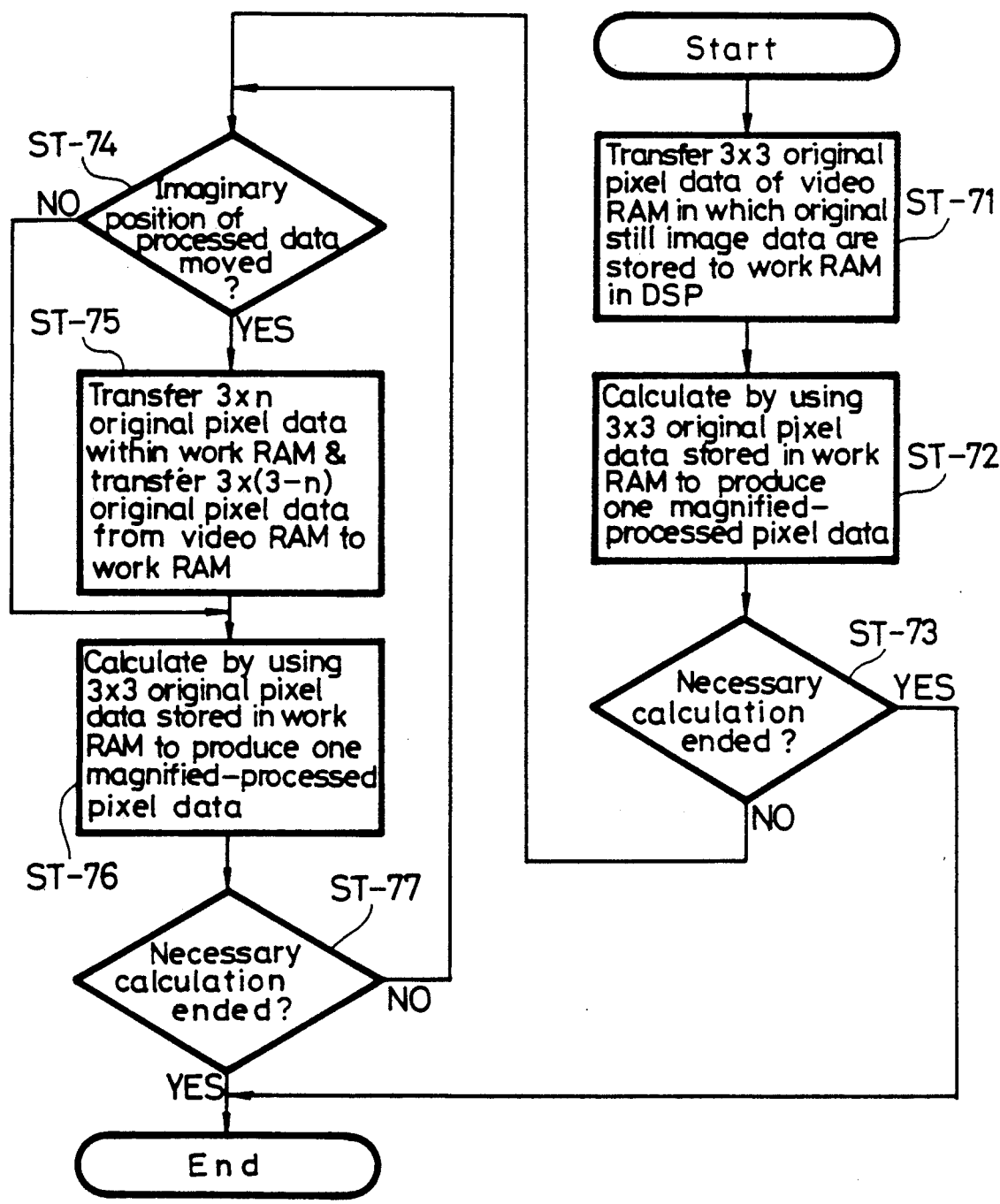
FIG. 18 is a flow chart to which reference will be made in explaining the memory control operation for the spline interpolation.

Referring to FIG. 18, following the Start of operation, at step ST-71 $3 \times 3$ original pixel data (for example, $P_0, P_1, P_2, P_5, P_6, P_7, P_{10}, P_{11}, P_{12}$ shown in FIG. 14) read out from the video RAM 6 in which original still picture data are stored are transferred to the work RAM 16 in the digital signal processing circuit 15 (in step ST-71).

In the next step ST-72, the calculation is carried out by using $3 \times 3$ original pixel data $P_0, P_1, P_2, P_5, P_6, P_7, P_{10}, P_{11}, P_{12}$ stored in the work RAM 16 to provide and deliver one magnified pixel data ($q_1$ in FIG. 14). The magnified pixel data $q_1$ thus delivered is written in the video RAM 6 at its predetermined address through the buffer memory 14 as shown in FIG. 15 and then stored therein.

Then, it is determined at step ST-73 whether or not the necessary calculation is ended. If a YES is output at step ST-73, the routine is ended. If a NO is output at step ST-73, the routine proceeds to the next decision step ST-74.

It is determined at step ST-74 whether or not the imaginary position of the processed pixel data moves to the adjacent position. If an answer at step ST-74 is a YES, the imaginary position moves to the position between the original pixel data $P_1, P_6, P_{11}$; and $P_2, P_7, P_{12}$, so that the routine moves to step ST-75. It is also determined at step ST-74 whether or not the imaginary position moves from the position between $P_0, P_5, P_{10}$; and $P_1, P_6, P_{11}$ to the position between the original pixel data $P_0, P_5, P_{10}$; and $P_2, P_7, P_{12}$. If a NO is output at step ST-74, then the routine proceeds to step ST-76. If a YES is output at step ST-74, then the routine proceeds to step ST-75.

In the example of FIG. 14, the imaginary position of the processed pixel data is changed from $q_1$ to $q_2$ and is moved to the position between the original pixel data $P_0$, $P_5$, $P_{10}$; and $P_2$, $P_7$, $P_{12}$ so that the routine proceeds to step ST-75.

In step ST-75, $3 \times n$, in this example, $3 \times 2$ original pixel data $P_1$, $P_2$, $P_6$, $P_7$, $P_{11}$, $P_{12}$ are transferred to the predetermined addresses of the work RAM 16, and new $3 \times (3-n)$, in this example, 3 original pixel data $P_3$, $P_8$ and $P_{13}$ from the video RAM 6 are transferred to the work RAM 16. Then, the routine proceeds to step ST-76.

In step ST-76, the calculation is carried out by using $3 \times 3$ original pixel data $P_1$, $P_2$, $P_3$, $P_6$, $P_7$, $P_8$, $P_{11}$, $P_{12}$ and $P_{13}$ stored in the work RAM 16 to provide and deliver one data $q_2$ is written in the video RAM 6 as its predetermined address via the buffer memory 14 as shown in FIG. 15 and then stored therein. Then, the routine proceeds to the next decision step ST-77.

It is determined in step ST-77 whether or not the necessary calculation is ended. If a YES is output at step ST-77, the routine is ended. If a NO is output at step ST-77, then the routine returns to step ST-74.

In this manner, the magnified pixel data $q_3$, $q_4$, $q_5$, $q_6$, $q_7$, ... are calculated and outputted, and are written in the video RAM 6 at its predetermined addresses as shown in FIG. 15.

While in the above-mentioned embodiment the magnifying processing is carried out, the present invention is also applied to the reducing processing. In this case, the original pixel data should be properly selected and removed.

Having described preferred embodiments of the invention in detail with reference to the accompanying drawings, it is to be understood that the present invention is not limited to those precise embodiments and that many changes and modifications could be effected by one skilled in the art without departing from the spirit and scope of the invention as defined by the appended claims.

We claim as our invention:

1. A method of processing original still picture data which represents an original still image and is stored in a video memory and storing processed still picture data representing the original still image after having been changed in size in a predetermined location of the video memory, the method comprising the steps of:
    (a) setting an XY orthogonal coordinate system on the video memory;
    (b) setting a reference line on the video memory parallel to one of the X and Y axes of the orthogonal coordinate system and passing through a point of intersection of hypothetical lines, each of which is to connect corresponding pixels of the original and changed in size still images;
    (c) moving $\alpha$ replications of each pixel data on a line of the original still image parallel to the reference line and furthest from the reference line to addresses of the video memory forming a line of the changed in size still image, where $\alpha$ is a real, positive number other than zero; and
    (d) repeating the preceding step for pixel data on lines of the still image parallel to the reference line and next furthest from the reference line and the succeeding lines, to thereby store the processed still picture data representing the changed in size still image in the video memory.

2. A method according to claim 1, wherein $\alpha$ is a real integer and the changed in size still image is an enlarged image of the original still image.

3. A method according to claim 1, wherein $\alpha$ is a fraction and the changed in size still image is a reduced image of the original still image.

4. A method according to claim 1, further comprising a step of storing pixel data close to the reference line in buffer memory means prior to the moving step.

5. A method according to claim 4, wherein the pixel data close to the reference line belongs to a rectangular area of the original still image parallel to the reference line.

6. A method according to claim 5, wherein the step of storing comprises the step of directly storing the pixel data in the buffer memory means and further comprising the steps succeeding to the step of repeating of processing the pixel data in the rectangular area and of moving the processed pixel data to a rectangular area of the changed in size still image in the video memory.

7. A method according to claim 5, wherein the step of storing includes the steps of processing the pixel data in the rectangular area and storing the processed pixel data in the buffer memory means and further comprising a step succeeding to the step of repeating of moving the processed pixel data stored in the buffer memory means to a rectangular area of the changed in size still image of the video memory.

8. An apparatus for processing an original still picture data representing an original still image and generating a processed still picture data representing a changed in size still image comprising:
    (a) video memory means for storing the original still picture data and the processed still picture data;
    (b) means for setting an XY orthogonal coordinate system on the video memory means;
    (c) means for setting a reference line parallel to one of the X and Y axes of the orthogonal coordinate system and passing through a point of intersection of hypothetical lines, each of which connects corresponding pixels of the original and change in size still images; and
    (d) processing and restoring means for replicating and transferring pixel data of the original still image line by line, beginning from the pixel data on a line of the original still image parallel to the reference line and furthest from the reference line and for restoring the processed pixel data to addresses of the video memory means forming a line of the changed in size still image, and repeating the process for the next furthest and each succeeding line of the original still image.

* * * * *